(12) United States Patent
Huang et al.

(10) Patent No.: US 12,139,893 B2
(45) Date of Patent: Nov. 12, 2024

(54) WALL-CONCEALED FAUCET AND SHOWER SYSTEM

(71) Applicant: Yongqiang Yan, Fujian (CN)

(72) Inventors: Lengjie Huang, Fujian (CN); Pingqing Zhang, Xiamen (CN); Haihua Su, Fujian (CN); Changzheng Ni, Xiamen (CN)

(73) Assignee: Yongqiang Yan, Xiamen (CN)

( * ) Notice: Subject to any disclaimer, the term of this patent is extended or adjusted under 35 U.S.C. 154(b) by 316 days.

(21) Appl. No.: 17/681,572

(22) Filed: Feb. 25, 2022

(65) Prior Publication Data
US 2023/0193603 A1  Jun. 22, 2023

(30) Foreign Application Priority Data
Dec. 20, 2021  (CN) .......................... 202123211139.5

(51) Int. Cl.
*E03C 1/04* (2006.01)
*E03C 1/02* (2006.01)
*H02K 7/00* (2006.01)

(52) U.S. Cl.
CPC .......... *E03C 1/0404* (2013.01); *E03C 1/0408* (2013.01); *E03C 2001/026* (2013.01); *E03C 2001/0416* (2013.01); *E03C 2001/0417* (2013.01); *H02K 7/003* (2013.01)

(58) Field of Classification Search
CPC ................. E03C 1/0404; E03C 1/0408; E03C 2001/026; E03C 2001/0416; E03C 2001/0417; H02K 7/003
See application file for complete search history.

(56) References Cited

U.S. PATENT DOCUMENTS

2013/0333764 A1* 12/2013 Wright ................. E03C 1/0408
137/551

FOREIGN PATENT DOCUMENTS

| CN | 210661483 U | * | 6/2020 | |
| CN | 214037085 U | * | 8/2021 | ............. E03C 1/057 |
| CN | 113757430 A | * | 12/2021 | |

* cited by examiner

*Primary Examiner* — Christine J Skubinna

(57) ABSTRACT

The present utility model discloses a wall-concealed faucet, including a box body pre-buried in a wall and a valve body disposed in the box body. A first valve seat and a second valve seat for disposing a regulating valve and a switching valve respectively are formed on the valve body, and inlet water openings two or more outlet water openings for supplying cold water and hot water respectively are disposed on the valve body. The inlet water opening communicates through a water channel in the valve body with the regulating valve disposed on the first valve seat. The regulating valve is in communication with the switching valve disposed in the second valve seat. The regulating valve is used to regulate a water temperature and a flow rate, and the switching valve is used to switch a water delivery state of each outlet water opening.

14 Claims, 4 Drawing Sheets

WALL-CONCEALED FAUCET AND SHOWER SYSTEM

CROSS-REFERENCE TO RELATED APPLICATION

The present application is based on, and claims priority from, Chinese application number CN202123211139.5, filed Dec. 20, 2021, the disclosure of which is hereby incorporated by reference herein in its entirety.

TECHNICAL FIELD

The present utility model relates to the technical field of water-heated bathrooms, and in particular to a wall-concealed faucet and a shower system.

BACKGROUND

Conventionally, a faucet of a shower system is mainly mounted in three manners: (1) Exposed pipes and unconcealed mounting: the bodies of inlet water pipes and a water mixing valve are both exposed. This manner has advantages of simple mounting, easy repair but has disadvantages of poor aesthetics and therefore this manner is mainly applied at low-end places. (2) Concealed pipes and unconcealed mounting: the water pipes are pre-buried in a wall, but the body of the water mixing valve is exposed. Although this manner is the most popular mounting manner at present, it is generally required to connect one end of a vertical pipe to a top spray shower head and connect the other end of the vertical pipe to a movable handheld shower head via a hose, leading to the problems of complex structure and lack of aesthetics. (3) Concealed mounting: the water pipes and the water mixing valve are both pre-buried in the wall, and only an outlet water opening and a switch are exposed. For users pursuing for simplicity and fashion, the concealed mounting manner can provide a feel of extreme simplicity that the other two manners cannot provide, and thus it is becoming increasingly popular.

The existing concealed faucet has a single function and usually controls flow rate, water temperature and water delivery state by three switches respectively, leading to complex structure and tedious mounting. Further, it has no function of display.

SUMMARY

To overcome the shortcomings of the prior art, the present utility model is to provide a wall-concealed faucet.

To achieve the above object, the present utility model provides the following technical solution.

A wall-concealed faucet includes a box body pre-buried in a wall and a valve body disposed in the box body. A first valve seat and a second valve seat for disposing a regulating valve and a switching valve respectively are formed on the valve body, and a inlet water opening and two or more outlet water openings for connecting cold water and hot water are further disposed on the valve body. The inlet water opening is communicated through a water channel in the valve body with the regulating valve disposed on the first valve seat, and the regulating valve is in communication with the switching valve disposed on the second valve seat. The regulating valve is used to regulate a water temperature and a flow rate, and the switching valve is used to switch a water delivery state of each outlet water opening.

A water-through chamber for disposing a hydraulic power generating device is further formed on the valve body, and the hydraulic power generating device is electrically connected to an electronic element disposed inside or outside the box body.

In some embodiments, the inlet water openings are disposed at both sides of the first valve seat and communicate with inlet water holes on the regulating valve respectively. An outlet water hole in communication with the switching valve is further disposed on the regulating valve. The regulating valve is connected to a handle and a knob disposed at the top of the handle to regulate an outlet water temperature and a flow rate respectively.

In some embodiments, the inlet water openings are communicated with both sides of the first valve seat via inlet water channels respectively, and a stop valve is disposed on each of the inlet water channels respectively.

In some embodiments, the regulating valve is a thermostatic water mixing valve.

In some embodiments, the water-through chamber is disposed between the first valve seat and the second valve seat and communicates with the first valve seat and the second seat respectively. The cold water and the hot water are mixed in the regulating valve, and then flow from the first valve seat to the second valve seat through the water-through chamber. When the mixed water flows through the water-through chamber, an impeller is driven to rotate. The impeller is connected to an input shaft of a power generator to achieve autonomous power generation and supply electricity to the electronic element. The electronic element at least includes a display screen disposed on a panel of the box body and a microcontroller for receiving and storing data.

In some embodiments, the microcontroller is electrically connected to the display screen and controls the display screen to display one or more of actual water temperature, recommended water temperature, ambient temperature, humidity, date, time, a water delivery state and a self-defined or preset water delivery mode according to information provided by an external sensor or stored internally.

In some embodiments, the switching valve is a press-type switching valve, and a button is mounted at the top of the switching valve and may be pressed to selectively open the outlet water opening or close all outlet water openings.

In some embodiments, the box body includes a housing, a panel and a positioning column. The valve body is mounted in the housing, the positioning column is detachably connected between the valve body and the panel, and the panel is adjustably connected to screw holes on the housing by screws.

In some embodiments, the positioning column includes a first positioning column and a second positioning column. The first positioning column is thread-sleeved around the regulating valve, one end of the first positioning column is abutted against the first valve seat, and the other end of the first positioning column is fitted with the panel. The second positioning column is sleeved around the switching valve, one end of the second positioning column is fitted with the second valve seat, and the other end of the second positioning column is fitted with the panel.

According to another aspect of the present utility model, there is provided a shower system. The shower system includes a top spray shower head, a lower outlet water opening and the wall-concealed faucet as described above. The top spray shower head and the lower outlet water opening are connected to the outlet water openings of the wall-concealed faucet respectively, and the inlet water openings of the wall-concealed faucet are connected to cold and hot inlet water pipes respectively.

The present utility model has the following beneficial effects.

The wall-concealed faucet according to the present utility model may regulate the water temperature and the flow rate and switch water delivery states by using only two switches. The present embodiment is advantageous because of its simple structure, easy mounting and high level of safety. Further, the built-in hydraulic power generating device can supply power to the electronic element such as the display screen. Therefore, diversified functions can be provided while ensuring better environmental protection.

DETAILED DESCRIPTION OF THE EMBODIMENTS

Figure 1:
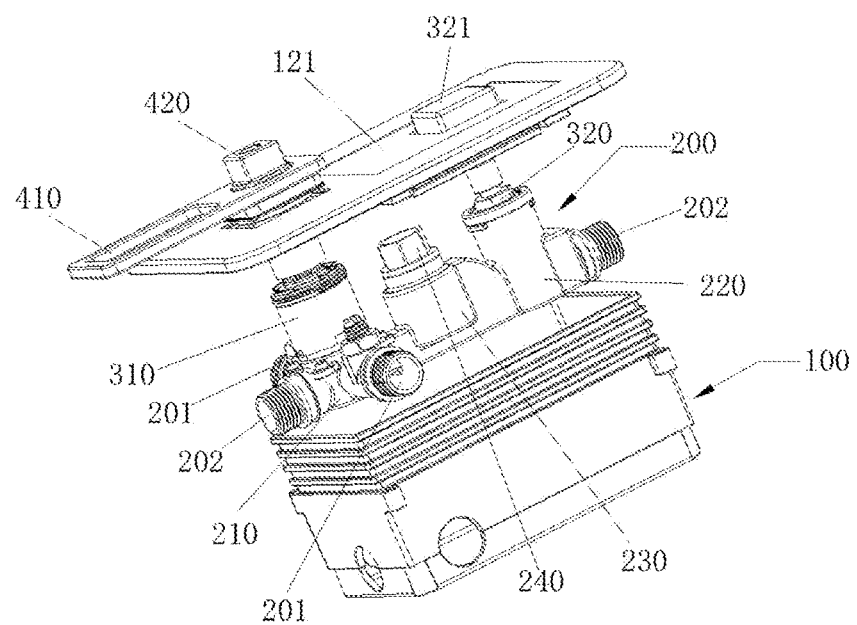
FIG. 1 is a structural schematic diagram of a wall-concealed faucet according to an embodiment of the present utility model.

In order to make the objects, the technical solutions and the advantages of the embodiments of the present utility model clearer, the technical solutions of the embodiments of the present utility model will be clearly and fully described in combination with accompanying drawings in the embodiments of the present utility model. Apparently, the described embodiments are merely some embodiments of the present utility model rather than all embodiments. All other embodiments obtained by those skilled in the art based on the embodiments of the present utility model without making creative effort shall all fall within the scope of protection of the present utility model. Therefore, the following detailed descriptions of the embodiments of the present utility model provided in the accompanying drawings are not meant to limit the scope of protection of the present utility model, but only represent some preferred embodiments of the present utility model. All other embodiments obtained by those skilled in the art based on the embodiments of the present utility model without making creative effort shall all fall within the scope of protection of the present utility model.

In the descriptions of the present utility model, it is noted that, the orientations or positional relationship indicated by the terms "upper", "lower", "inner", "outer", "front", "rear", "both ends", "one end", "the other end", "one surface" and "the other surface" and the like are based on orientations or positional relationship shown in the drawings and are only used for ease of descriptions and simplification of descriptions, rather than indicating or implying that an apparatus or element must have a specific orientation or constructed or operated in a specific orientation. Therefore, the above orientations or positional relationship shall not be understood as limiting the present utility model. Furthermore, the terms "first" and "second" are used for the purpose of description only and shall not be understood as indicating or implying relative importance.

In the descriptions of the present utility model, it is noted that, unless otherwise stated clearly, the terms "dispose" and "connect" etc. should be understood in a broad sense, for example, the "connect" may be a fixed connection, or a detachable connection or an integral connection, or a mechanical connection, or a electrical connection or a direct connection or an indirect connection through an intermediate medium, or an internal communication between two elements. Persons of ordinary skill in the art may understand the specific meanings of the above terms in the present utility model according to specific situations.

The contents of the present utility model are described in detail below in combination with the embodiments.

Figure 2:
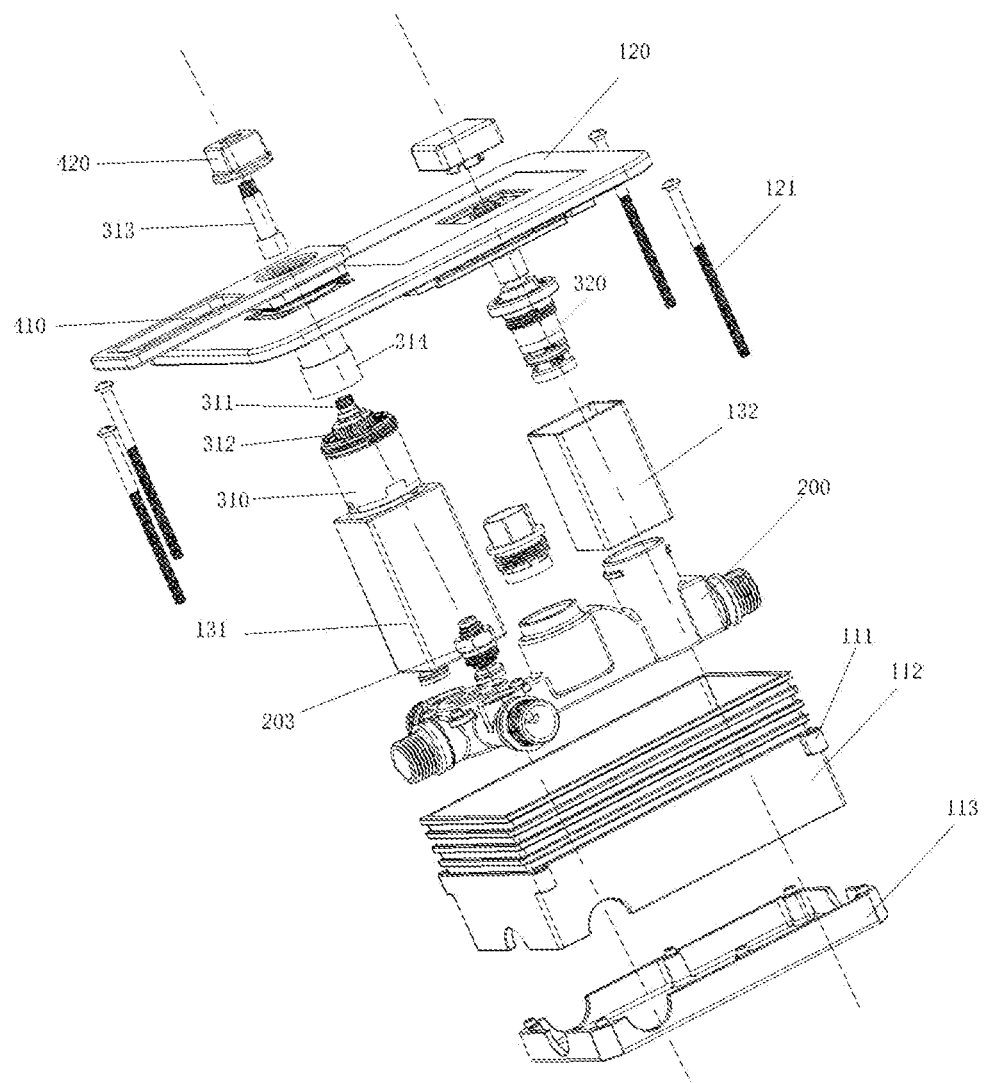
FIG. 2 is a structural exploded view of a wall-concealed faucet according to an embodiment of the present utility model.
Figure 3:
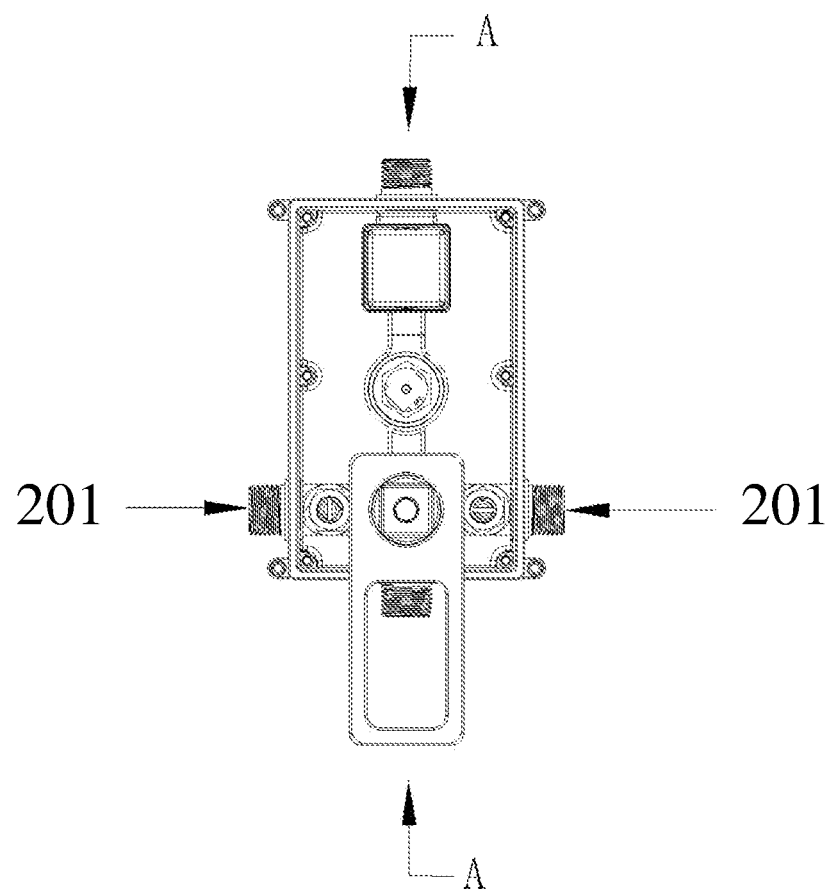
FIG. 3 is a front view of a wall-concealed faucet with a panel hidden according to an embodiment of the present utility model.
Figure 4:
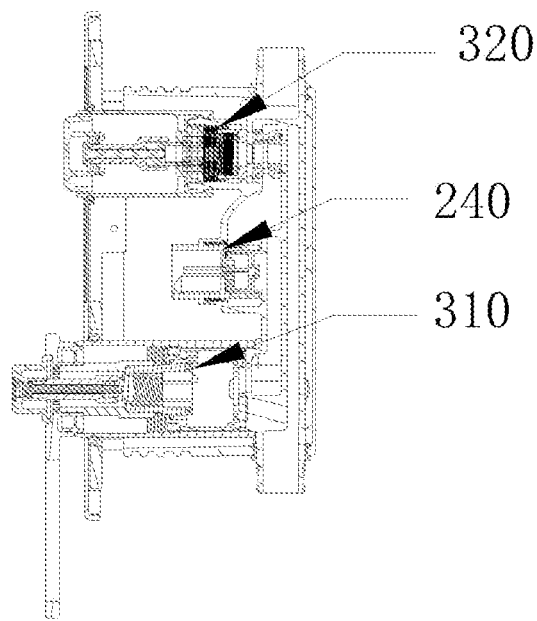
FIG. 4 is a sectional view taken along A-A of FIG. 3.
Figure 5:
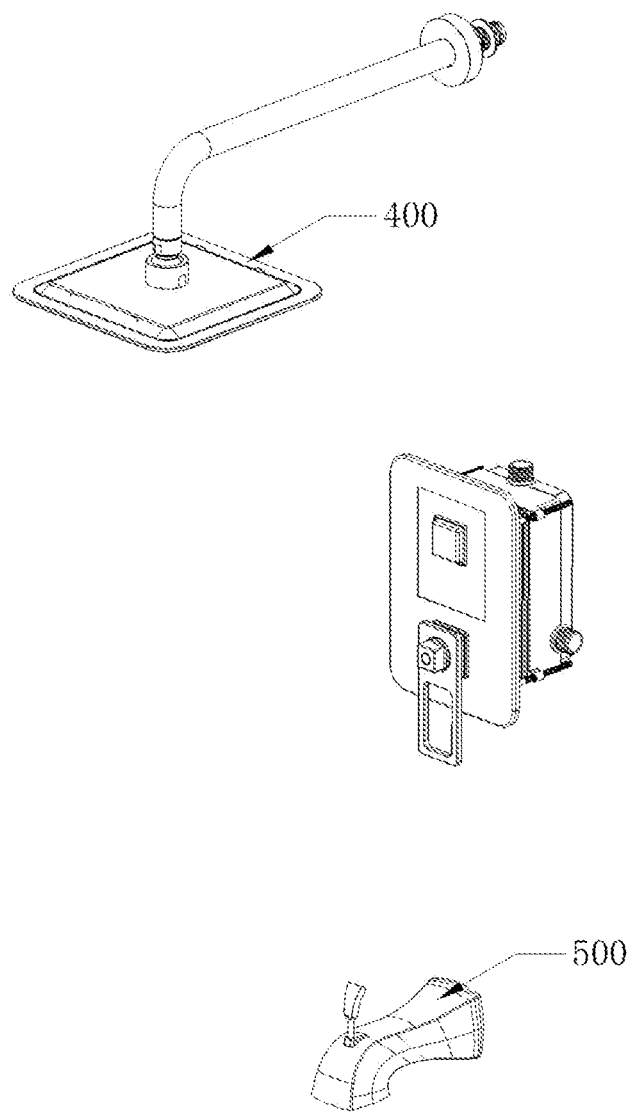
FIG. 5 is a structural schematic diagram of a shower system according to an embodiment of the present utility model.

As shown in FIGS. 1-3, a wall-concealed faucet includes a box body 100 pre-buried in a wall and a valve body 200 disposed in the box body. A first valve seat 210 and a second valve seat 220 for disposing a regulating valve 310 and a switching valve 320 respectively are formed on the valve body and an inlet water opening 201 and two or more outlet water openings 202 for connecting cold water and hot water are further disposed on the valve body. The inlet water opening 201 is communicated via a water channel in the valve body 200 with the regulating valve 310 disposed on the first valve seat 210, and the regulating valve 310 is communicated with the switching valve 320 disposed in the second valve seat 220. The regulating valve 310 is used to regulate a water temperature and a flow rate, and the switching valve 320 is used to switch a water delivery state of each outlet water opening 202. A water-through chamber 230 for disposing a hydraulic power generating device 240 is further formed on the valve body 200, and the hydraulic power generating device 240 is electrically connected to an electronic element disposed inside or outside the box body 100.

In some embodiments, the inlet water openings 201 are disposed at both sides of the first valve seat 210 and communicate with inlet water holes on the regulating valve 310 respectively. An outlet water hole in communication with the switching valve 320 is further disposed on the regulating valve 310. The regulating valve 310 is connected to a handle 410 and a knob 420 disposed at the top of the handle to regulate an outlet water temperature and a flow rate respectively. Specifically, a first fitting gear 311 and a second fitting gear 312 are disposed at the top of the regulating valve 310. The knob 420 is fitted to the first fitting gear 311 through a first connection column 313 to regulate opening degrees of the inlet water holes of cold water and hot water so as to regulate the water temperature. The handle 410 is fitted to the second fitting gear 312 through a second connection column 314 to regulate an opening degree of the outlet water hole so as to regulate an outlet water flow rate. The handle 410 and the knob 420 can rotate relatively and independently. The structure may integrate the regulation of the water temperature and the flow rate into a same handle to save space and materials; by independently regulating the water temperature with the knob, prevent scalds of children or pets and the like resulted from inadvertent touching or rotating of the temperature regulating handle; and further avoid the problem of needing to readjust the water temperature for next use after outlet water is cut off halfway through a shower. In some embodiments, the inlet water openings 201 are communicated with both sides of the first valve seat 210 via inlet water channels, and a stop valve 203 is disposed on the inlet water channel. Thus, the inlet water can be cut off by closing the stop valve without needing to close an inlet water main valve. In this case, the maintenance can be carried out more conveniently and quickly. In some embodiments, the regulating valve 310 may be a commercially available thermostatic water mixing valve. When the temperature regulating knob is set to a particular temperature, regardless of how the inlet water temperature and pressure of cold water and hot water change, a ratio of cold water to hot water in the outlet water opening will changes along, so as to keep the outlet water temperature always constant. The specific structure thereof is not the core content of the present utility model and thus is not shown in the drawings. Those of ordinary skill in the art may understand the working principle of the structure with reference to the existing thermostatic water mixing valve, and therefore no redundant descriptions will be made herein.

In some embodiments, the water-through chamber 230 is disposed between the first valve seat 210 and the second valve seat 220 and is communicated with the first valve seat 210 and the second seat 220 respectively. The cold water and the hot water are mixed in the regulating valve 310, and then flow from the first valve seat 210 to the second valve seat 220 through the water-through chamber 230. When the mixed water flows through the water-through chamber, an impeller is driven to rotate. The impeller is connected to an input shaft of a power generator to achieve autonomous power generation and supply electricity to the electronic element. The electronic element at least includes a display screen 121 disposed on a panel of the box body and a microcontroller (not shown) for receiving and storing data.

In some embodiments, the microcontroller is electrically connected to the display screen 121 and controls the display screen 121 to display one or more of actual water temperature, recommended water temperature, ambient temperature, humidity, date, time, a water delivery state and a self-defined or preset water delivery mode according to information provided by an external sensor (not shown) or stored internally. Specifically, when the display screen is used to display an actual water temperature, a temperature sensor may be disposed in the water-through chamber 230 to send water temperature information to the microcontroller for processing and then display the processed water temperature information on the display screen 121. Similarly, when the display screen is used to display an ambient temperature or a humidity, a temperature or humidity sensor may be disposed outside the box body 100 or on the panel to collect signals and then transmit the signals to the microcontroller and then display it on the display screen.

In some embodiments, the switching valve 320 is a press-type switching valve, and a button 321 is mounted at the top of the switching valve 320 and may be pressed to selectively open the outlet water opening 202 or close all outlet water openings 202. Specifically, the switching valve 320 has a ball-point pen type press structure which can switch the water delivery state of the outlet water opening 202 through cooperation with an outlet water channel inside the valve body 200. For example, in a case of two outlet water openings 202, there may be three water delivery states as follows: a first outlet water opening is opened and a second outlet water opening is closed; the first outlet water opening is closed and the second outlet water opening is opened; and the first outlet water opening and the second outlet water opening are both closed. When two outlet water openings 202 are connected to a top spray shower head and a lower outlet water opening respectively, the outlet water openings 202 may be disposed at the bottom of the first valve seat 210 and at the top of the second valve seat 220 respectively, which are inversely perpendicular to the inlet water opening 201. The press-type switching of the water delivery state is convenient to operate and intuitive to experience, and can further provide a second manner of closing a water path. Thus, when the outlet water is temporarily cut off in the halfway of shower and then re-opened, it is not required to regulate the water temperature and the flow rate again, bringing conveniences.

In some embodiments, the box body 100 includes a housing 110, a panel 120 and a positioning column. The valve body 200 is mounted in the housing 110, the positioning column is detachably connected between the valve body 200 and the panel 120, and the panel 120 is adjustably connected to screw holes 111 on the housing 110 by screws 121. The display screen 121 is disposed in a middle portion of the panel 120. The housing 110 may include an upper housing 112 and a lower housing 113 which are mated by assembly, and several mounting holes are opened at the connection position of the upper housing 112 and the lower housing 113 to connect an inlet water pipe and an outlet water pipe.

In some embodiments, the positioning column 130 includes a first positioning column 131 and a second positioning column 132. The first positioning column 131 is thread-sleeved around the regulating valve 310, one end of the first positioning column 131 is abutted against the first valve seat 210, and the other end of the first positioning column 131 is fitted with the panel 120. The second positioning column 132 is sleeved around the switching valve 320, one end of the second positioning column 132 is fitted with the second valve seat 220, and the other end of the second positioning column 132 is fitted with the panel 120. When the wall-concealed faucet is mounted, a reserved space in the wall must be opened. Since the reserved space may have a certain tolerance when opened, the panel may be misaligned with a wall surface or there may be a gap therebetween after being mounted, which not only affects an operation feeling but also presents an unaesthetic appearance. The box body structure of the present utility model can be conveniently mounted and positioned due to the design of the positioning columns, a certain adjustment space is reserved for the assembly of the valve body and the panel, and the panel and the box body may also be appropriately adjusted by tightening or loosening the screws. Thus, the aforementioned problems are effectively solved.

According to another aspect of the present utility model, there is provided a shower system. The shower system includes a top spray shower head 400, a lower outlet water opening 500 and the wall-concealed faucet as described above. The top spray shower head 400 and the lower outlet water opening 500 are connected to the outlet water openings 202 of the wall-concealed faucet through water pipes pre-buried in the wall respectively. The inlet water openings 201 of the wall-concealed faucet are connected to cold and hot inlet water pipes pre-buried in the wall respectively.

The present utility model is operated based on the following working principle: water enters a thermostatic valve core through cold and hot inlet water openings, the handle controls an outlet water flow rate, and the knob controls a outlet water temperature; then, the water mixed through the thermostatic valve core enters the water channel through the outlet water hole, and then flows through the hydraulic power generating device which generates power under the impact of water flow to supply electric energy to the electronic element such as the display screen; next, the water flows through a multi-function switching button which controls the water delivery state.

The technical solutions of the above embodiments may be further combined or replaced, and the above descriptions are used only to describe the preferred embodiments of the present utility model, rather than limit the idea and scope of the present utility model. Various changes and improvements made to the technical solutions of the present utility model by those skilled in the art without departing from the design idea of the present utility model shall fall within the scope of protection of the present utility model.

The invention claimed is:

1. An wall-concealed faucet, comprising a box body pre-buried in a wall and a valve body disposed in the box body, wherein,
 a first valve seat and a second valve seat for disposing a regulating valve and a switching valve respectively are formed on the valve body, an inlet water opening and two or more outlet water openings for connecting cold water and hot water respectively are disposed on the valve body, the inlet water opening communicates via a water channel in the valve body with the regulating valve disposed on the first valve seat, the regulating valve is in communication with the switching valve disposed in the second valve seat, the regulating valve is used to regulate a water temperature and a flow rate, and the switching valve is used to switch a water delivery state of each outlet water opening;
 a water-through chamber is further formed on the valve body, and an electronic element is disposed inside or outside the box body;
 wherein the box body comprises a housing, a panel and a positioning column, the valve body is mounted in the housing, the positioning column is detachably connected between the valve body and the panel, and the panel is adjustably connected to screw holes on the housing by screws; and
 the positioning column comprises a first positioning column and a second positioning column, the first positioning column is thread-sleeved around the regulating valve, one end of the first positioning column is abutted against the first valve seat, and the other end of the first positioning column is fitted with the panel, the second positioning column is sleeved around the switching valve, one end of the second positioning column is fitted with the second valve seat, and the other end of the second positioning column is fitted with the panel.

2. The wall-concealed faucet of claim 1, wherein the inlet water openings are disposed at both sides of the first valve seat and communicate with inlet water holes on the regulating valve respectively, an outlet water hole in communication with the switching valve is further disposed on the regulating valve, and the regulating valve is connected to a handle and a knob disposed at the top of the handle to regulate an outlet water temperature and a flow rate respectively.

3. The wall-concealed faucet of claim 2, wherein the inlet water openings are communicated with both sides of the first valve seat via inlet water channels respectively, and a stop valve is disposed on the inlet water channels respectively.

4. The wall-concealed faucet of claim 3, wherein the regulating valve is a thermostatic water mixing valve.

5. The wall-concealed faucet of claim 1, wherein the microcontroller is electrically connected to the display screen and controls the display screen to display one or more of actual water temperature, recommended water temperature, ambient temperature, humidity, date, time, a water delivery state and a self-defined or preset water delivery mode according to information provided by an external sensor or stored internally.

6. The wall-concealed faucet of claim 1, wherein the switching valve is a press-type switching valve with a button mounted at top, and the button is pushed to selectively open the outlet water opening or close all outlet water openings.

7. A shower system, comprising a top spray shower head, a lower outlet water opening and the wall-concealed faucet according to claim 1, wherein the top spray shower head and the lower outlet water opening are connected to the outlet water openings of the wall-concealed faucet respectively, and the inlet water openings of the wall-concealed faucet are connected to cold and hot inlet water pipes respectively.

8. The shower system, comprising the top spray shower head, the lower outlet water opening and the wall-concealed faucet according to claim 3, wherein the inlet water openings are disposed at both sides of the first valve seat and communicate with inlet water holes on the regulating valve respectively, the outlet water hole in communication with the switching valve is further disposed on the regulating valve, and the regulating valve is connected to the handle and the knob disposed at the top of the handle to regulate the outlet water temperature and the flow rate respectively.

9. The shower system, comprising the top spray shower head, the lower outlet water opening and the wall-concealed faucet according to claim 4, wherein the inlet water openings are communicated with both sides of the first valve seat via inlet water channels respectively, and a stop valve is disposed on the inlet water channels respectively.

10. The shower system, comprising the top spray shower head, the lower outlet water opening and the wall-concealed faucet according to claim 8, wherein the regulating valve is the thermostatic water mixing valve.

11. The shower system, comprising the top spray shower head, the lower outlet water opening and the wall-concealed faucet according to claim 7, wherein the microcontroller is electrically connected to the display screen and controls the display screen to display one or more of actual water temperature, recommended water temperature, ambient temperature, humidity, date, time, the water delivery state and the self-defined or preset water delivery mode according to information provided by the external sensor or stored internally.

12. The shower system, comprising the top spray shower head, the lower outlet water opening and the wall-concealed faucet according to claim 7, wherein the switching valve is the press-type switching valve with the button mounted at top, and the button is pushed to selectively open the outlet water opening or close all outlet water openings.

13. The shower system, comprising the top spray shower head, the lower outlet water opening and the wall-concealed faucet according to claim 7, wherein the box body comprises the housing, the panel and the positioning column, the valve body is mounted in the housing, the positioning column is detachably connected between the valve body and the panel, and the panel is adjustably connected to screw holes on the housing by screws.

14. A shower system, comprising
 a top spray shower head,
 a lower outlet water opening and
 a wall-concealed faucet comprising a box body pre-buried in a wall and a valve body disposed in the box body, wherein,
 a first valve seat and a second valve seat for disposing a regulating valve and a switching valve respectively are formed on the valve body, an inlet water opening and two or more outlet water openings for connecting cold water and hot water respectively are disposed on the valve body, the inlet water opening communicates via a water channel in the valve body with the regulating valve disposed on the first valve seat, the regulating valve is in communication with the switching valve disposed in the second valve seat, the regulating valve is used to regulate a water temperature and a flow rate, and the switching valve is used to switch a water delivery state of each outlet water opening;

a water-through chamber is further formed on the valve body, and an electronic element is disposed inside or outside the box body;

the top spray shower head and the lower outlet water opening are connected to the outlet water openings of the wall-concealed faucet respectively, and the inlet water openings of the wall-concealed faucet are connected to cold and hot inlet water pipes respectively, the box body comprises the housing, the panel and the positioning column, the valve body is mounted in the housing, the positioning column is detachably connected between the valve body and the panel, and the panel is adjustably connected to screw holes on the housing by screws; and the positioning column comprises the first positioning column and the second positioning column, the first positioning column is thread-sleeved around the regulating valve, one end of the first positioning column is abutted against the first valve seat, and the other end of the first positioning column is fitted with the panel, the second positioning column is sleeved around the switching valve, one end of the second positioning column is fitted with the second valve seat, and the other end of the second positioning column is fitted with the panel.

* * * * *